UNITED STATES PATENT OFFICE.

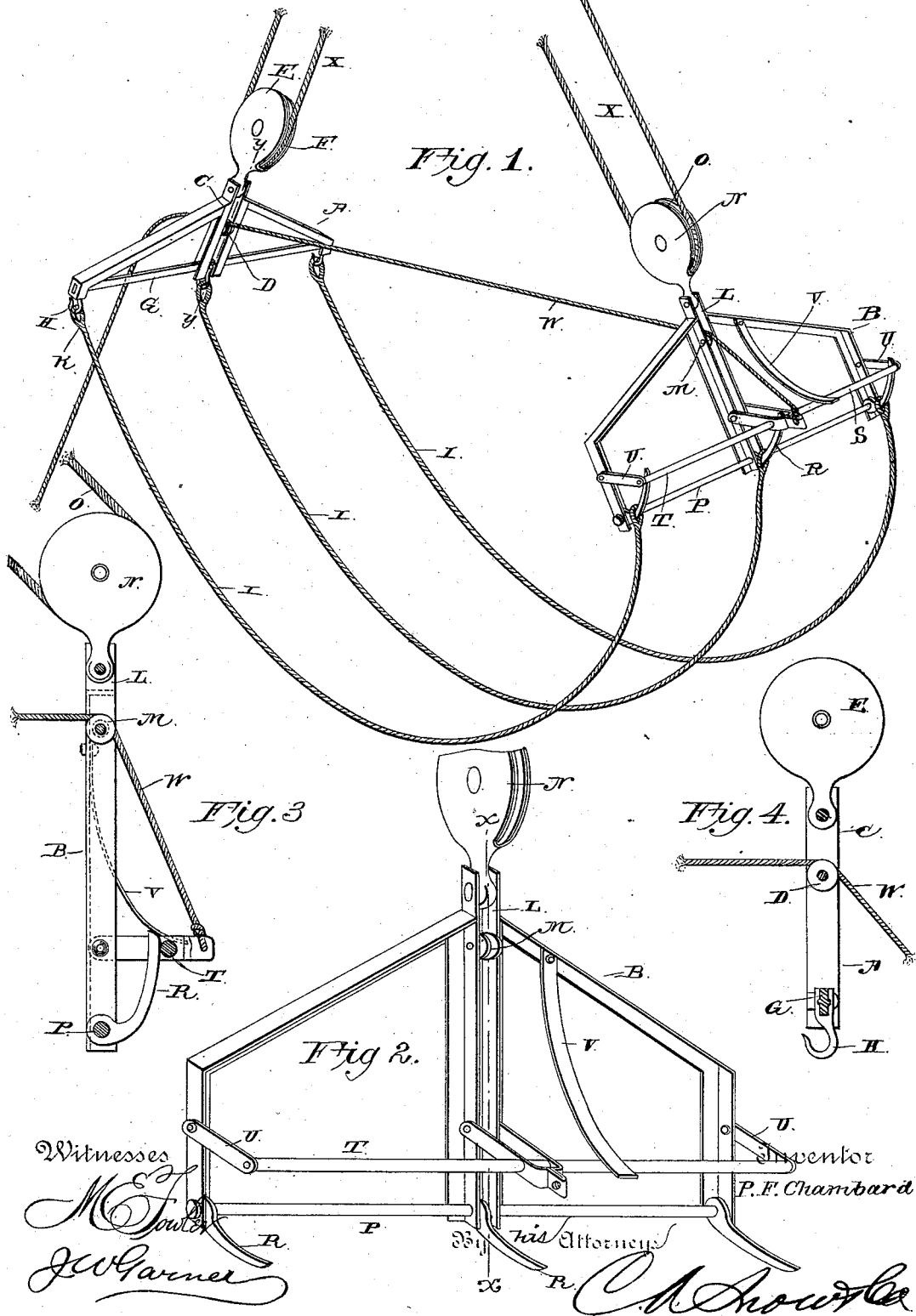

PETER F. CHAMBARD, OF FAYETTE, OHIO.

HAY-SLING.

SPECIFICATION forming part of Letters Patent No. 372,203, dated October 25, 1887.

Application filed July 28, 1887. Serial No. 245,531. (No model.)

*To all whom it may concern:*

Be it known that I, PETER F. CHAMBARD, a citizen of the United States, residing at Fayette, in the county of Fulton and State of Ohio, have invented a new and useful Improvement in Hay-Slings, of which the following is a specification.

My invention relates to an improvement in hay-slings; and it consists in the peculiar construction and combination of devices, that will be more fully set forth hereinafter, and particularly pointed out in the claims.

This invention is particularly adapted for use in connection with a hay elevator and carrier such as described in my application for Letters Patent of the United States, Serial No. 223,479, filed January 5, 1887, though it can be used on any hay carrier or elevator, as desired.

In the accompanying drawings, Figure 1 is a perspective view of a hay-sling embodying my improvements. Fig. 2 is a detached perspective view of one of the frames of the sling, showing the detents disengaged in order to release the supporting-ropes. Fig. 3 is a vertical sectional view taken on the line $xx$ of Fig. 2. Fig. 4 is a similar view taken on the line $yy$ of Fig. 1.

A B represent a pair of frames, which are made of iron or other suitable material, and are preferably of the form here shown. The frame A has a vertical central slotted arm, C, in which is journaled a sheave, D. To the upper end of the said arm is attached a block, E, in which is journaled a pulley, F. The ends of the frame A and the lower end of the slotted arm C thereof are connected by a cross-bar, G, to which are secured near its ends and at its center a series of three engaging-hooks, H.

I represents a series of supporting-ropes, which have eyes K formed at each end, the said ropes being adapted to be placed on the wagon or hay-rack and loaded down with hay in the usual manner, and when loaded attaching the hooks to the ropes.

L represents a vertical central slotted arm with which the frame B is provided, and M represents a pulley which is journaled in the said slotted arm at a suitable distance from its upper end. To the upper end of the said arm is attached a block, N, in which is journaled a pulley, O.

P represents a rock-shaft which is journaled in the lower ends of the frame B and in the power end of the arm L, the said shaft serving to connect the ends of the frame to the said shaft. At the center and near the ends thereof are rigidly attached engaging hook-arms R.

S represents a detent-yoke, comprising a shaft, T, having rock-arms U at its center and at its ends, the rock-arms having their inner ends pivoted to the arms at the end of the frame B and to the arm L thereof. A flat spring-arm, V, has its upper end attached to the upper side of the frame B and its lower end bearing on the shaft T, thereby serving normally to force the detent-yoke downward, as indicated in Figs. 1, 2, and 3.

W represents the trip-rope, which is attached to the yoke S, passes over the sheaves or pulleys M and D, and the outer end of which extends downward to the ground.

X represents the elevating-rope, which depends from the carrier or carriage (not shown) and passes around the pulleys O and F, the said rope serving to raise or lower the sling with its load of hay.

The operation of my invention is as follows: The ropes I are first laid lengthwise on the hay or wagon rack, the hay is then deposited in the rack over the ropes, and when a sufficient load is made up the eyes at the ends of the ropes are attached to the hooks H of the frame A and the engaging-hooks R of the frame B. The said hooks R are then turned upward, the yoke S being previously raised to allow the points of the hooks to clear its bar T, and the said yoke is then lowered so that its bar T bears against the outer sides of the hooks R and serves to retain the latter in position shown in Figs. 1 and 3, and thereby retain the ends of the ropes I in engagement with the said hooks when the sling is elevated, thus causing the hay to be carried with the sling. When the hay is to be discharged, this is accomplished by drawing down on the trip-rope W, thereby elevating the detent-yoke S against the tension of spring V, and causing the rod T of the said yoke to slip from the hooks R, when the weight of the hay instantly turns the said hooks downward and causes the ends of the ropes I to slip from the hooks and discharge the hay, as will be readily understood.

Having thus described my invention, I claim—

1. In a hay-sling, the combination of the frame A, adapted to be attached to one end of the supporting-ropes L, and the frame B, separate and independent of the frame A, and having the pivoted hooks to engage the other ends of the supporting-ropes and the detent to engage the said pivoted hooks, substantially as described.

2. The combination, in a hay-sling, of the frame A, adapted to be attached to one end of the supporting-ropes L, the frame B, having the pivoted hooks to engage the other ends of the supporting-ropes and the detent to engage the said pivoted hooks, and the elevating-rope attached to the frames A and B, the latter being separate from and independent of each other, substantially as described.

3. The combination, in a hay-sling, of the frames A B, having the guiding-sheaves D M, the ropes I, attached at one end to frame A, the hooks R, pivoted to frame B, adapted to engage the other ends of said ropes, the detent-yoke adapted to retain the hooks R in position when the ropes are attached thereto, and the trip-rope W, attached to the detent and passed over the pulleys M D, substantially as described.

4. In a hay-sling, the frame A, having the hooks for the attachment of one end of the supporting-ropes and provided with the pulley E for the elevating-rope, and the frame B, having the pivoted hooks adapted to engage the other ends of the supporting-ropes and the detent to engage the said pivoted hooks and simultaneously release the same, said frame B being further provided with the pulley O for the elevating-rope, all in combination, substantially as described.

5. A hay-sling comprising the frames A B, separate and independent of each other, the separate and independent ropes I, arranged parallel, the ends of the ropes being independently connected to the said frames at different points thereof, and a releasing device to release one end of all the ropes from one of the frames, as set forth.

6. A hay-sling comprising the frames A B, separate and independent of each other, the frame A having the series of independent rigid hooks H, and the frame B having the series of independent pivoted hooks R, the ropes I, secured at one end to the hooks H of the frame A and at the other end to the hooks R, and the detent to hold up the pivoted hook R and thus retain the rope thereon, as set forth.

In testimony that I claim the foregoing as my own I have hereto affixed my signature in presence of two witnesses.

PETER F. CHAMBARD.

Witnesses:
E. G. SIGGERS,
WM. NELSON MOORE.